Aug. 20, 1968   A. L. HUBBARD   3,397,523
COTTON HARVESTER

Filed July 9, 1965   2 Sheets-Sheet 1

INVENTOR.
A. L. HUBBARD

BY *William A. Murray*

ATTORNEY

INVENTOR.
A. L. HUBBARD
BY William A. Murray
ATTORNEY

United States Patent Office 3,397,523
Patented Aug. 20, 1968

3,397,523
COTTON HARVESTER
Arthur L. Hubbard, Des Moines, Iowa, assignor to Deere & Company, Moline, Ill., a corporation of Delaware
Filed July 9, 1965, Ser. No. 470,838
3 Claims. (Cl. 56—41)

ABSTRACT OF THE DISCLOSURE

A cotton salvaging structure for use with a cotton picker having a plant passage formed by inner sides of a pair of adjacent upright compartments. The cotton is picked by picking spindles that are disposed in vertically spaced horizontal rows that extend periodically in the passage. The salvaging structure includes laterally coextensive plates fixed to the respective sides of the compartments and extend into the passage. The plates include forward horizontal portions forward of the spindles adjacent the ground, rear portions between the two lower rows of spindles, and inclined portions extending between the forward and rear portions.

---

This invention relates to a cotton harvester incorporating the use of an unright harvesting drum with vertically spaced rows of horizontal spindles adapted to extend into a plant passage for harvesting ripened cotton bolls from cotton plants. Still more particularly this invention relates to a cotton salvaging attachment for a cotton harvester that includes laterally disposed plate means that moves fallen cotton upwardly and rearwardly in the plant passage to a position between the rows of spindles.

In one of the more conventional type cotton harvesters, there is provided housing structure having left- and right-hand upright compartments spaced transversely apart and having inner adjacent walls defining a fore-and-aft extending plant passage. Provided within one of the compartments is an upright harvesting drum having a series of vertically spaced rows of laterally extending picking spindles that are adapted to project through one of the inner walls and into the plant passage for the purpose of harvesting the cotton bolls from the plants. Supported on and projecting forwardly from the respective compartments is a pair of plant lifters or gatherers that tend to guide the plants into the passage.

In most cotton fields there is a quantity of fallen cotton and low cotton on the plants that is desired to be saved and harvested. The lower row of harvesting spindles is therefore placed relatively close to the ground so that the spindles may salvage the cotton on the extreme lower portion of the plants and lying on top of the ground. To aid in this salvaging operation there are often provided a series of fingers or tines that extend rearwardly from the gatherers that will tend to raise the lower portion of the plants and also in some instances tend to pick up and guide fallen cotton bolls into the area of the harvesting spindles. Such tines are normally beneath the level of the lower row of spindles and do in some instances tend to compress the fallen bolls into the ground so as to prevent the lower row of spindles from contacting those bolls. Also, such tines must by necessity be placed above the level of the ground and often do not pick up the fallen bolls.

It is the purpose of the present invention to provide laterally extending grates that project inwardly from the inner walls of the compartments into the passage. The grates are composed of forward portions that lie closely adjacent the ground and project inwardly from the lower edges of the forward gatherers or plant lifters. The grates further include horizontal portions that project inwardly from the inner walls of the compartments above the lower row of spindles. Inclined portions interconnect the forward lower grate portions and the rear grate portions positioned above the lower row of spindles. With such a grate structure, the forward portions will tend to pick up fallen bolls and the lower portions of the plants. The inclined and rear portions will raise the bolls and plants to a level above the lower row of spindles. There will always therefore be a row of spindles operating from beneath the lower portion of the plants and should the fallen bolls tend to gravitate off of the rear grate portions they will pass into the path of the lower row of spindles and will be collected. The lower row of spindles will also be capable of salvaging the bolls on the ground that have not been picked up by the grate structures. The portions of the plants and the fallen bolls that are picked up by the grate structures will be guided into proper harvesting position in respect to the row of spindles above the rear grate portions.

The wall of the passage opposite the spindles is normally yieldable away from the passage to permit the heavier cotton plants to move through the passage. It is a further purpose of the present invention to support part of the grate structure on the yieldable wall and to have an overlapping relation with the remaining grate structure to accommodate the varying positions of the yieldable wall.

Other objects and advantages of the present invention will become apparent to those skilled in the art as the nature of the invention is better understood from the following description and as shown in the accompanying drawings.

Figure 1:
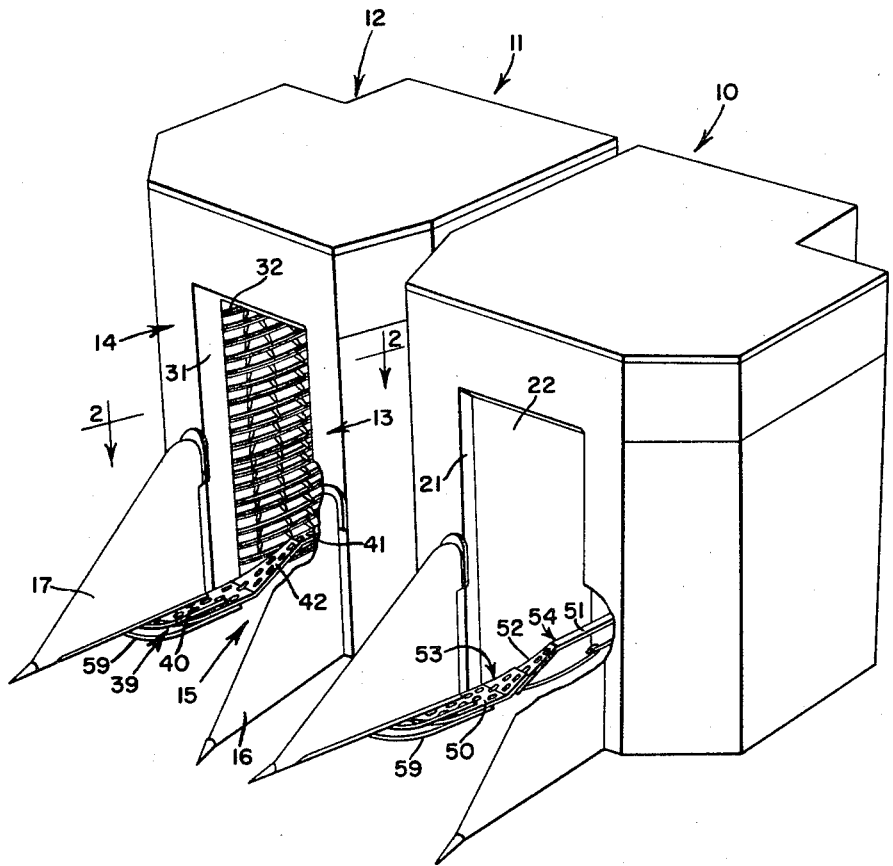
FIG. 1 is a front and side perspective view of a pair of harvesting units. Portions of the units are broken away for the purpose of showing details of the present invention.
Figure 2:
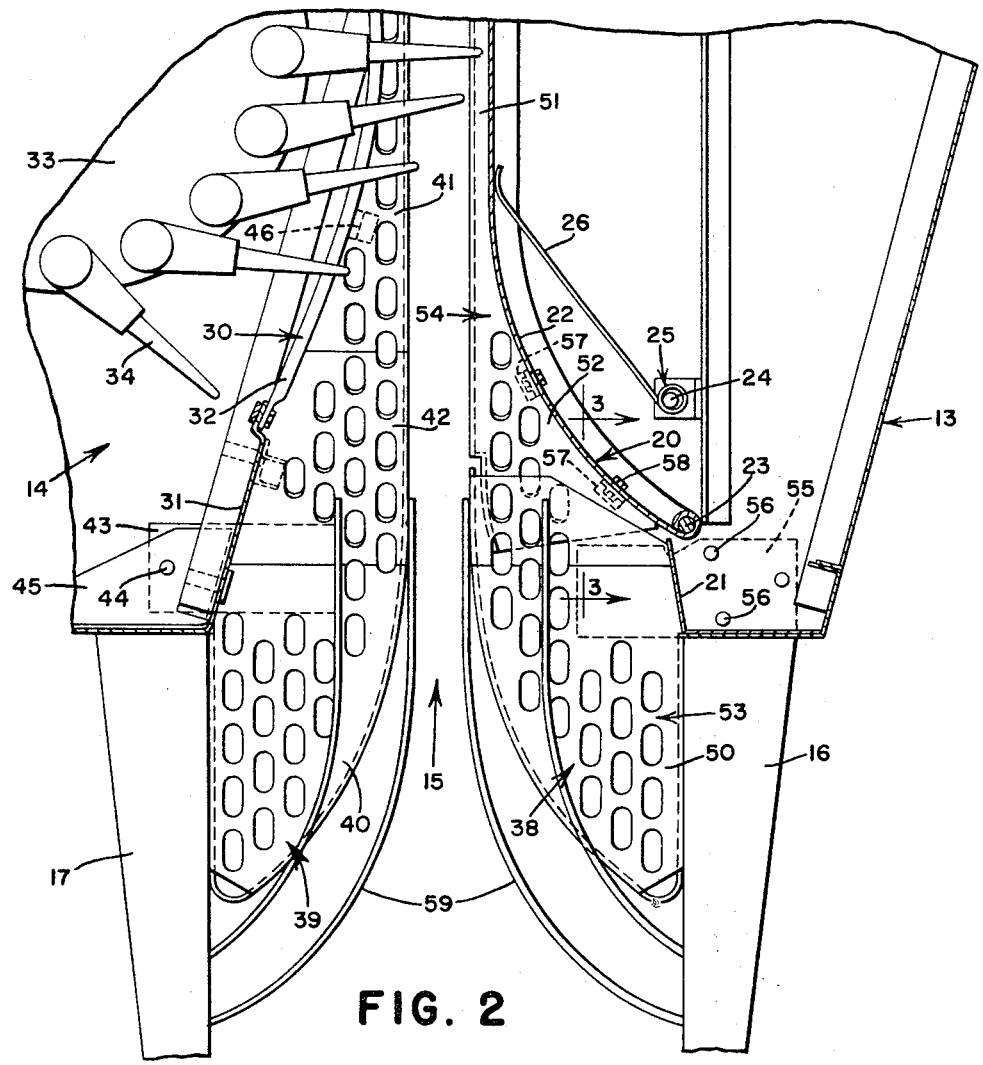
FIG. 2 is an enlarged sectional view taken substantially along the line 2—2 of FIG. 1.

FIG. 1 shows a pair of cotton harvesting row units 10, 11 disposed in a side-by-side relation as would occur if supported on a conventional type two-row cotton harvester. Such a harvester is shown in more detail in U.S. Patent 3,088,262 and reference may be had to that patent for a more complete description relative to the supporting framework and drive mechanism for the row units 10, 11. The row units 10, 11 are substantially identical to one another with an obvious reversal of positions of various of the mechanisms within the units 10, 11. Since the units 10, 11 are substantially identical and are completely identical relative to the structure of the present invention, details of only the right row unit 11 in regard to the present inventive structure will be given.

The row unit 11 is composed of a housing structure 12 having left- and right-hand upright compartments 13, 14, respectively, spaced transversely apart to define a fore-and-aft extending plant passage 15. Supported on and extending forwardly from the front portions of the respective compartments 13, 14 is a pair of gathering or plant lifting elements 16, 17. The gathering elements 16, 17 generally define a forward continuance of the plant passage 15. The compartment 13 has an inner wall structure 20 composed in part at its forward end of an upright panel 21. An arcuate shaped pressure plate or panel 22 continues rearwardly from the rear edge of the upright panel 21 and is supported on the main frame of the compartment by an upright pivot 23. Consequently the entire plate or panel 22 may move inwardly or outwardly in respect to the passage 15. Also supported on the main frame of the compartment 13 is a second upright pivot 24 carrying a series of vertically spaced torsion springs 25, each of which has a leg portion 26 engaging the outer side of the panel 22. The springs 25 therefore bias the panel 22 toward the passage 15 and yieldably resist movement of the panel 22 away from the passage 15.

The compartment 14 has an inner upright wall structure 30 in opposed relation to the upright wall structure 20. The upright wall structure 30 includes an upright panel 31 at the forward end of the compartment 14. The upright panel 31 has bolted to its rear edge a series of vertically spaced horizontal members or grid bars 32. Supported within the housing compartment 14 is an upright harvesting drum 33 having a plurality of vertically spaced rows of laterally extending spindles 34. As the drum 33 rotates the spindles are adapted to move into the passage 15 through the spacings between the grid bars or members 32 for the purpose of harvesting the ripened cotton bolls from the plants moving through the passage.

As previously mentioned the inner wall structures 20, 30 define the passage 15. The passage 15 has, therefore, a relatively wide front portion as defined by the spacing between the panels 21, 31. The pressure plate panel 22 and grid bars 32 are arcuate shaped and converge at the rear portion of the passage 15 so as to cause the passage 15 to have a relatively narrow rear portion. It is in the narrow portion of the plant passage 15 that the maximum penetration of the spindles 34 into the passage occurs.

Laterally disposed plate structures 38, 39 extend into the plant passage 15 from the inner sides of the respective compartments 13, 14. The plate structure 39 includes a forward section 40 lying closely adjacent the ground and extending inwardly in respect to the passage from the lower edge of the forward gathering element 17. The plate structure 39 also has a rear horizontal section 41 that extends inwardly in respect to the passage 15 at the narrow or rear portion of the passage. As may be clearly seen in FIG. 1, the rear portion or section 41 is disposed above the lower row of spindles 34 and is vertically offset above the forward section 40. The front and rear horizontal sections 40, 41 are joined by an integral inclined section 42 that extends upwardly and rearwardly from the front section 40 to the rear section 41. The inclined section 42 is disposed in the wide portion of the plant passage 15 as defined by the spacing between the upright panels 21, 31. The plate structure 39 is fixed to the compartment 14 by a horizontally disposed plate 43 that is fixed to the underside of the plate structure 39 by welding or other suitable means. The plate 43 extends under the frame part 45 of the housing 14 and may be bolted, as at 44, to that part. The plate structure 39 is further supported on the housing compartment 14 by a series of L-shaped tabs or brackets, as indicated in dotted representation at 46, that are fixed to the underside of the rear section 41 and to a respective grid bar 32 underlying the section 41. The forward section 40 is not in any manner connected to the forward gatherer 17 since the gatherer 17 is adapted to move vertically and it is desired to retain the forward section 40 at a relatively low and ground proximate position.

Figure 3:
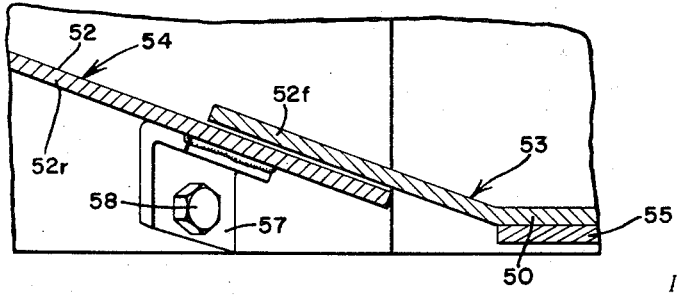
FIG. 3 is an enlarged sectional view taken substantially along the line 3—3 of FIG. 2.

The plate structure 38 is composed of a front horizontal section 50, a rear horizontal section 51 and an inclined central section 52 that joins the front and rear sections 50, 51. The sections 50, 51 and 52 are generally opposite the respective sections 40, 41 and 42. The plate structure 38 is composed of a front portion 53 and a rear portion 54 that overlap at the inclined section 52 of the plate structure. The overlap relation between the plate portions 53, 54 can best be shown in FIG. 3. The front portion 53 does, therefore, include the entire front horizontal section 50 and a front part 52f of the inclined section 52. The rear portion 54 includes the entire rear horizontal plate section 51 and a rear part 52r of the inclined section 52. The front portion 53 has a plate 55 welded to the underside of the front horizontal section.

The plate 55 extends under a floor frame of the housing compartment 53 and is bolted at 56 thereto. The rear portion 54 has a series of longitudinally spaced L-shaped lugs or brackets 57 fixed to the underside of the plate portion 54 and bolted, as at 58, to the pressure plate 22. Consequently the rear portion 54 is capable of moving laterally in respect to the passage 15. Since the rear portion 54 is fixed to the pressure plate 22, it also will move laterally about the axis of the upright pivot 23. The portion of overlap between the parts 52f and 52r will accommodate the lateral movement of the pressure plate 22 and the rear plate portion 54 so as to prevent a gap or opening to occur between the two portions 53, 54 when the pressure plate 22 is in its maximum outer position. The forward section 50, while extending inwardly from the lower inner edge of the plant gatherer or lifter 16, is not fixed to the plant lifter 16. Consequently the plant lifter 16 may move vertically in accordance with the contour of the ground. Metal tines or fingers 59 converge inwardly from the undersides of the respective gatherers 16, 17 toward the center of the plant passage 15. The tines 59 operate to hold down grass and other weeds growing adjacent the cotton plant and also operate to raise the lower portion of the plants off of the ground.

The invention operates in the following manner. As the harvester moves over the ground, the tines 59 and the forward horizontal sections 40, 50 will operate to pick up fallen cotton bolls and will also raise the lower portion of the plants. The fallen bolls on the upper surface of the respective plate structures 38, 39 will then be moved by the plants upwardly over the inclined sections 42, 52 to the upper horizontal sections 41, 51 positioned between the lower two horizontal rows of spindles 34. Should the cotton bolls fall off of the upper horizontal sections 41, 51 they will fall into the path of the spindles 34 in the lowermost row of spindles. The cotton bolls remaining on the sections 41, 51 will, of course, be properly positioned for the spindles in the row above the sections to contact and retain the bolls thereon.

There has thus been shown and described an improvement for use with a cotton harvester having a pair of compartments 13, 14 spaced apart transversely to define a fore-and-aft extending passage 15. The improvement comprises a pair of laterally disposed plate structures 38, 39 that extend inwardly from the respective inner sides 20, 21 of the compartments 13, 14. The plate structures 38, 39 have forward sections 50, 51 disposed closely adjacent the ground and projecting horizontally inwardly from the forward gathering elements 16, 17. The plate structures also include rear horizontal sections 41, 51 that are positioned between the two lowermost rows of spindles 34. Inclined sections 42, 52 interconnect the forward horizontal sections 40, 50 and the rear horizontal sections 41, 51. The inner wall 20 is yieldable away from the passage and has connected thereto the rear portion 54 of the plate structure 38 on that side of the passage. The rear portion 54 underlies the forward portion 53 of the plate structure on that side of the passage so that as the pressure plate 22 yields, the rear portion 54 that is attached thereto may also yield away from the passage 15.

While only one form of the invention has been shown and described, it should be recognized that other forms and variations may occur to those skilled in the art. Therefore, while the preferred form has been shown in detailed manner for the purpose of clearly and concisely illustrating the principles of the invention, it should be understood that there is no intention to limit or narrow the invention beyond the broad concept set forth in the appended claims.

What is claimed is:

1. In a cotton harvester composed of an upright housing having a pair of forwardly extending transversely spaced upright plant-gathering elements and left- and right-hand upright compartments spaced transversely apart to have adjacent inner walls define a fore-and-aft extending plant passage substantially in a rearward continuance of the spacing between the gathering elements, the passage extending from a relatively wide front portion adjacent the gathering elements to a relatively narrow rear portion, the inner wall adjacent the passage of one compartment being composed of vertically spaced horizontal members and the inner wall adjacent the passage of the other compartment being composed of an upright plate supported on a vertical axis and adapted to yield laterally in respect to the passage, and an upright harvesting drum supported in the one compartment and having a series of vertically spaced and laterally extending spindles adapted to project in the passage through the spacings between the horizontal members with the maximum penetration in the passage being in the narrow portion thereof, the improvement comprising: lateral plates fixed to the housing for extension in the passage and the spacing between the gathering elements with forward sections thereof disposed closely adjacent the ground and projecting inwardly from the gathering elements, rear sections thereof disposed above the lower picking spindles and projecting inwardly from the wall portions of the narrow portion of the passage, and inclined sections thereof extending inwardly from the wall portions defining the wide portion of the passage and continuing upwardly and rearwardly from the lower front sections to the upper rear sections, the plates extending inwardly from said other compartment being composed of at least two parts one of which is fixed to the yieldable wall and the other being forwardly thereof and fixed against movement to the housing, said parts being in an overlapping relation to accommodate movement of the upright yieldable plate away from the passage.

2. In a cotton harvester composed of an upright housing having left- and right-hand upright compartments spaced transversely apart to have adjacent inner walls define a fore-and-aft extending plant passage having a relatively wide front portion, a relatively narrow rear portion, the inner wall adjacent the passage of one compartment being composed of vertically spaced horizontal members and the inner wall adjacent the passage of the other compartment being composed of an upright plate adapted to yield laterally in respect to the passage, and an upright harvesting drum supported in the one compartment and having a series of vertically spaced rows of laterally extending spindles adapted to project in the passage through the spacings between the horizontal members with the maximum penetration in the passage being in the narrow portion thereof, the improvement comprising: laterally coextensive plates fixed to the housing and extending into the passage from the respective left- and right-hand compartments with forward sections thereof disposed closely adjacent the ground, upper rear sections thereof disposed between the two lower rows of picking spindles at the narrow portion of the passage, and intermediate inclined sections thereof extending upwardly and rearwardly from the lower front sections below the lower row of spindles to the upper rear sections.

3. The invention defined in claim 2 in which the plates on said other compartment are composed of two overlapping portions, one part being connected to the upright yielding plate and the other part being fixed to the housing forwardly of the one part.

References Cited

UNITED STATES PATENTS

| | | | |
|---|---|---|---|
| 1,926,338 | 9/1933 | Johnston | 56—119 |
| 2,023,491 | 12/1935 | Rust et al. | 56—14 |
| 2,333,965 | 11/1943 | Weems | 56—44 |
| 2,652,676 | 9/1953 | Rust | 56—28 X |
| 3,047,996 | 8/1962 | Hubbard | 56—41 |

ABRAHAM G. STONE, *Primary Examiner.*

P. RAZZANO, *Assistant Examiner.*